under 35 U.S.C. 154(b) by 812 days.

(12) United States Patent
Vartanian

(10) Patent No.: US 8,212,811 B2
(45) Date of Patent: Jul. 3, 2012

(54) METHOD OF CODING AND SYSTEM FOR DISPLAYING ON A SCREEN A DIGITAL MOCK-UP OF AN OBJECT IN THE FORM OF A SYNTHESIS IMAGE

(75) Inventor: Alexis Vartanian, Paris (FR)

(73) Assignee: Techviz, Paris (FR)

( * ) Notice: Subject to any disclaimer, the term of this patent is extended or adjusted under 35 U.S.C. 154(b) by 812 days.

(21) Appl. No.: 12/299,931

(22) PCT Filed: Apr. 27, 2007

(86) PCT No.: PCT/FR2007/051192
 § 371 (c)(1),
 (2), (4) Date: Nov. 7, 2008

(87) PCT Pub. No.: WO2007/135309
 PCT Pub. Date: Nov. 29, 2007

(65) Prior Publication Data
 US 2009/0135179 A1 May 28, 2009

(30) Foreign Application Priority Data
 May 12, 2006 (FR) ...................................... 06 04266

(51) Int. Cl.
 *G06T 15/00* (2006.01)
(52) U.S. Cl. ......... 345/419; 345/594; 345/626; 345/502
(58) Field of Classification Search ................. 345/419, 345/594, 626, 502
 See application file for complete search history.

(56) References Cited

U.S. PATENT DOCUMENTS

| 5,325,485 | A | 6/1994 | Hochmuth et al. |
| 5,777,620 | A | 7/1998 | Billyard |
| 6,362,825 | B1 | 3/2002 | Johnson |
| 7,397,481 | B2 * | 7/2008 | Endo et al. ................... 345/632 |
| 2003/0117589 | A1 | 6/2003 | Sasaki |
| 2005/0174361 | A1 * | 8/2005 | Kobayashi et al. ........... 345/633 |

FOREIGN PATENT DOCUMENTS

FR 2 840 705 12/2003

OTHER PUBLICATIONS

Molnar S et al, "PixelFlow: High Speed Rendering Using Image Composition", Computer Graphics Proceedings 26, Siggraph 92, Jul. 1992, pp. 231-240, Univ. of North Carolina.
Samanta R et al., "Hybrid Sort-First and Sort-Last Parallel Rendering With a Cluster of PC'S", Proceedings 2000 Siggraph/Europgraphics Workshop on Graphics., Aug. 2000, Switze.
Fearing P., "Predictive Rendering", University of British Columbia—MSC Thesis, 1996, XP002411578.

* cited by examiner

*Primary Examiner* — Maurice L McDowell, Jr.

(57) ABSTRACT

A method of coding, in the form of a digital file of a three-dimensional synthesis image, a model of an object formed by a stream of image elements (FEI) in which elementary images which are subsets of image elements $\{EI_e\}_{e=1}^{e=ex}$ are discriminated (A) in the stream (FEI), each elementary image is coded (B) according to an index value (n) representative of the elementary image, the numerical values ($Z_{k,g,i}$) of the 3D synthesis image are calculated (C) and these values are stored in the form of a digital file. Application to 3D display involving an interactive dialogue with a user of a graphics application.

14 Claims, 6 Drawing Sheets

METHOD OF CODING AND SYSTEM FOR DISPLAYING ON A SCREEN A DIGITAL MOCK-UP OF AN OBJECT IN THE FORM OF A SYNTHESIS IMAGE

The field of onscreen display of digital geometry data referred to as digital mock-ups in the form of a synthesis image is experiencing continuous growth, as a result of applications in the appropriate fields, such as the technical, scientific or research fields.

Among the above fields, there can be mentioned in particular computer-aided design for applications relating to the field of the mechanical industries, carrying out processes for the manufacture of particular items, remote operation in dangerous or sensitive areas, including, in particular, microsurgical or other operations.

All these fields of application require a very high level of precision and accuracy in the reproduction of objects or parts of objects, which can be achieved in synthesis imaging.

As shown for illustration purposes in FIG. 1a, onscreen systems for the display of a digital mock-up in the form of a synthesis image comprise, on a workstation for example, a client-side graphics application allowing digital signals to be supplied to a graphics card driver providing the interface with a graphics card, making it possible to control a display device.

As further shown in FIG. 1b, the graphics application supplies a stream of picture elements to the graphics card driver and to the graphics card. The picture element stream includes addressable picture elements, each formed by a geometrical shape, generally triangular, according to the current standards. The above-mentioned triangular shape is not essential, but the latter has proved of practical interest for three-dimensional synthesis imaging (3D imaging).

The above-mentioned display systems of the prior art are satisfactory, as they allow accurate and adaptive representations all kinds of objects in 3D synthesis imaging.

However, in spite of their adaptive character, their use is limited to objects having a very slowly-changing development, as a result, in particular, of the increase in the volume of information, and digital data supporting this information, required for dynamic processing of any representation of a synthesis object or 3D imaging.

In any case, apart from the very high computing power required for carrying out such processing, which is generally not available on commercial workstations on the market, the usual graphics cards required for 3D display of reconstituted synthesis images cannot claim to execute a totally satisfactory rendering of the fluidity of dynamic synthesis images, due to their inability to generate a refresh rate of an excessively large volume of display data.

In particular, in the field of 3D synthesis imaging, the difficulty at the display level is prohibitive, due to an inadequacy of the display resolution, the fixed number of pixels Np, and the volume, in number Nb, of addressable picture elements, in particular during 3D dynamic synthesis.

As the number of display pixels Np in the image is fixed, and therefore limited, there is no existing technical method making it possible to optimize the ratio Np/Nb of the number of pixels to the number of picture elements of the display image. Now in dynamic 3D image synthesis, the image is characterized by the speed, in number of picture elements Nb per second, and the 3D display is defined by the image display frequency $F_i$.

In particular, if the image display frequency is too low, $F_i < 5$ images per second, the system cannot be used to advantage, as the time taken to establish the image is too long and it is impossible to obtain a good picture, which causes a latency problem.

Moreover, the display then shakes, which is of course detrimental to the overall view of the object in 3D synthesis imaging.

The purpose of the present invention is to overcome the drawbacks of the synthesis imaging display systems and methods of the prior art by implementing a sui generis method and system for display on a screen of a digital mock-up of an object in the form of a synthesis image, by means of which, for each image, the inadequacy of the response to the volume of information to be displayed in each display area of the display screen is substantially overcome.

In particular, another object of the present invention is the implementation of a method and a system for the display on a screen of a digital mock-up of an object in the form of a 3D synthesis image, in which the volume or rate of dynamic information is substantially restricted by specific coding, which moreover makes it possible to increase substantially the fluidity of the 3D synthesis display.

A further purpose of the present invention is finally the implementation of a method and a system for displaying on a screen a digital mock-up of an object in the form of a 3D synthesis image in which is introduced a process of anticipation of the effect of any external event on the 3D synthesis representation and display, making it possible for example to maintain the fluidity of the 3D synthesis image display by anticipating the response of the application to this external event.

The coding method in the form of a digital file of the three-dimensional synthesis image of a digital mock-up of an object, starting from a model of this object formed by a picture element stream delivered by an application module starting from the digital mock-up, the subject-matter of the present invention, is noteworthy in that it includes at least the steps consisting of distinguishing, in the picture element stream, elementary images each constituting at least one part of the three-dimensional synthesis image to be displayed, coding each successive elementary image according to an index value representative of the content of this picture element, calculating the numerical values for the three-dimensional synthesis image from the index value representative of the content of each elementary image, and memorizing the numerical values of this synthesis image in the form of a file or set of numerical data.

The coding of each successive elementary image according to an index value representative of the content of this elementary image makes it possible to restrict substantially the volume or the flow of dynamic information required for the display and as a result to improve the fluidity of the 3D synthesis display.

The coding method which is the subject-matter of the invention is moreover noteworthy in that it consists of associating the index value of a group of picture elements with an address value of resources for calculating numerical values of the three-dimensional synthesis image.

This makes it possible to allocate a group of specific elementary images to each of the calculation resources of these numerical values according to their content, and thus to ensure a spatial segmentation by content of the three-dimensional synthesis image.

Such a procedure makes it possible to substantially reduce the effect of image shake on the 3D synthesis images of the prior art, by effectively overcoming the problem of latency.

The system for displaying on a screen a digital mock-up of an object in the form of a synthesis image, by means of an application module comprising a user interface which is the subject-matter of the invention, operates on an application module, which starting from the digital mock-up, delivers a model of this object formed by a stream of picture elements to a resource for the calculation of a three-dimensional image which can be displayed on this screen.

It is noteworthy in that it includes at least resources for filtering the stream of picture elements, installed at the input of the resource for calculating the three-dimensional image, these filtering resources comprising a module for distinguishing, in the stream of picture elements, elementary images each constituting at least one part of the image for display, a module for coding each successive elementary image according to an index value representative of the content of this elementary image, these index values being delivered to the resource for calculation of the three-dimensional image. This makes it possible to increase the fluidity of display by the display screen, by reconstituting the content of each elementary image by the resource for calculation of the three-dimensional image.

In particular, the system which is the subject-matter of the invention is noteworthy in that the index value is a numerical value obtained by application of a hashing function to each successive elementary image.

Moreover, this index value is a numerical value representative of the space-time discrepancy between two successive equivalent elementary images contained in two successive views of this object.

According to another noteworthy aspect of the system which is the subject-matter of the invention, the resource for the calculation of a three-dimensional image consists of a plurality of 3D graphics cards connected in parallel between the filtering resources and the screen. Each graphics card has a specific access address, and each index value representing the content of each successive elementary image of a group of elementary images constituting all or part of the object image for display is associated with a specific access address value of one of the graphics cards.

This makes it possible to allocate a specific group of elementary images, according to their content, to each of the graphics cards and thus to ensure a spatial segmentation by content of the display by masking and an acceleration of the fluidity of the display.

According to another noteworthy aspect, the module coding each elementary image according to an index value representing the content of each elementary image comprises resources for the correlation of a plurality of successive elementary images with the same storage address and same index value, this index value representing this elementary image respectively from a group of elementary images being sent to the resources for the calculation of the three-dimensional image.

According to another noteworthy aspect, the filtering resources moreover comprise a module inhibiting the correlation resources for any elementary image or group of elementary images which is recognized as correlated to the same address. This makes it possible to transmit an index value linked to this address to the resources for the calculation of the three-dimensional image and to accelerate the display.

The display system which is the subject-matter of the invention is finally noteworthy in that it further includes a resource for learning the development principle, when an alteration of a viewpoint of the object image is introduced, from a peripheral acting as user interface. This makes it possible to anticipate the calculation results and to reduce the computing time of the application module.

The computing time of the application module is thus made substantially independent of the actual capacity of the latter to calculate successive images of this object.

The coding method and the display system on a screen of a digital mock-up of an object in the form of a synthesis image, which is the subject-matter of the invention, can be used for any application module in the field of scientific, industrial or leisure activity in the field of video or online games involving an onscreen display of a digital mock-up in the form of a 3D synthesis image, in particular in the context of a 3D display involving an interactive dialogue with a user of this application module.

They will be better understood on reading the description and viewing the drawings below, in which in addition to FIGS. 1a and 1b relating to the prior art:

FIG. 2b shows, for illustration purposes, a preferred detailed non-restrictive embodiment of the coding method which is the subject-matter of the invention shown in FIG. 2a;

A more detailed description of the coding method in the form of a digital file of three-dimensional synthesis images of a digital mock-up of an object starting from a model of this object formed by a stream of picture elements delivered by an application module starting from this digital mock-up will now be given in connection with FIGS. 2a and 2b.

Figure 1B:
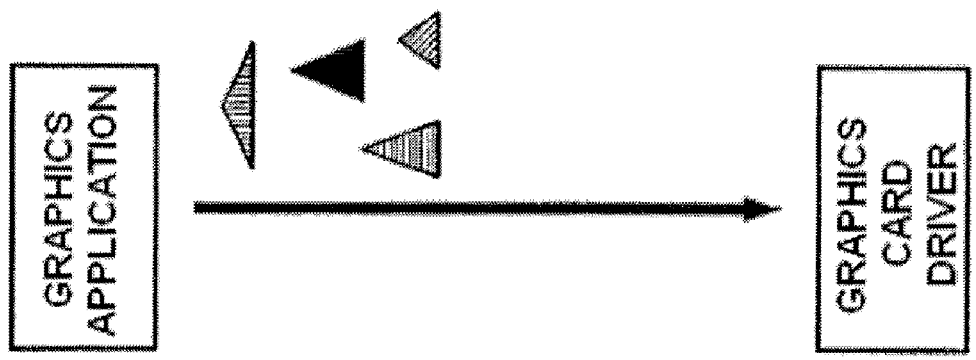
Figure 1A:
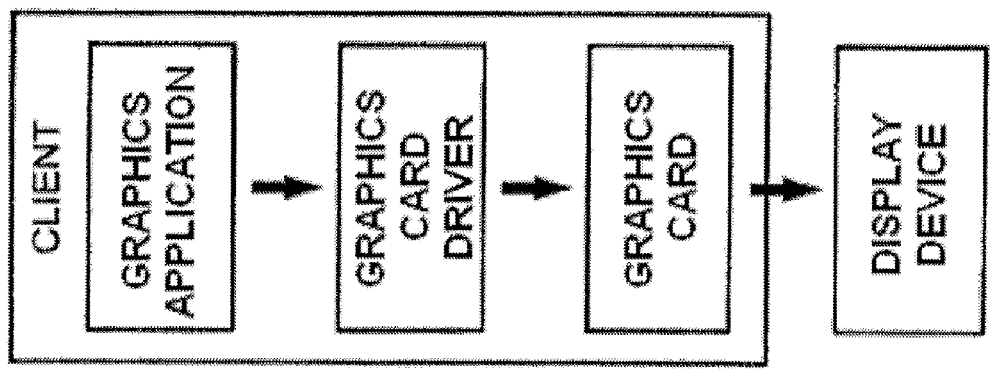
Figure 2B:
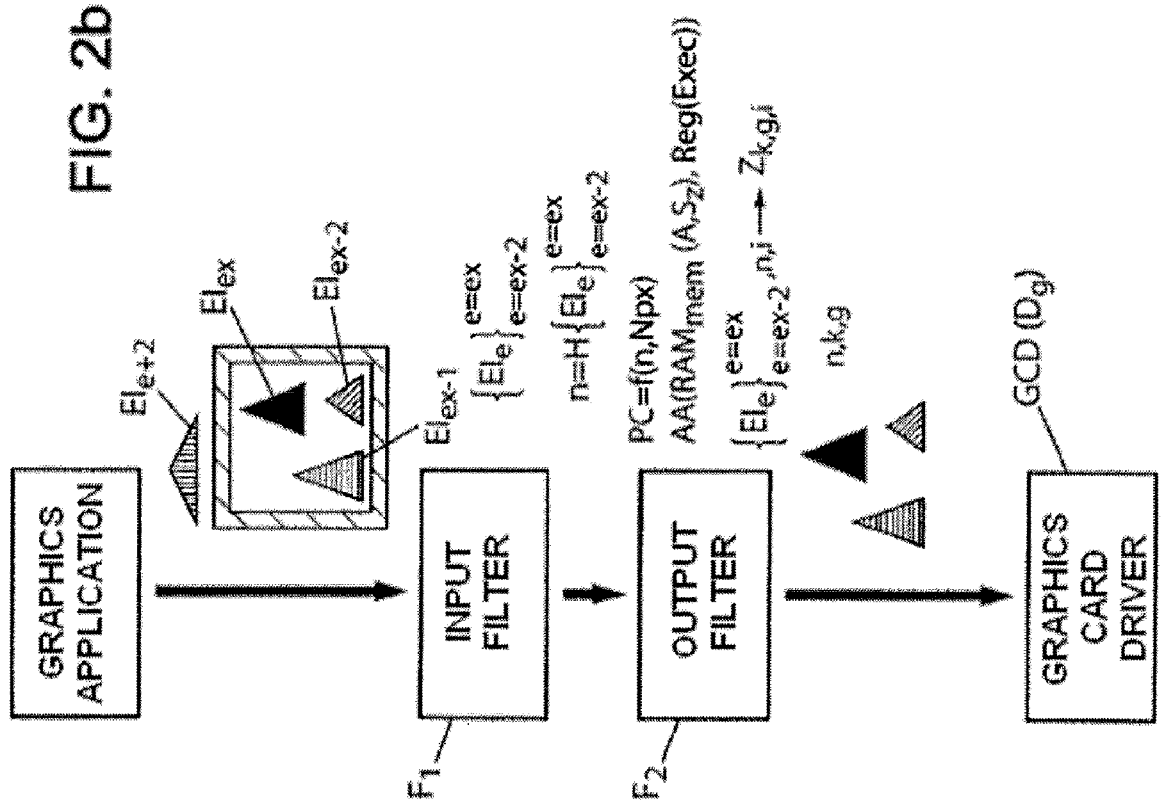
Figure 2A:
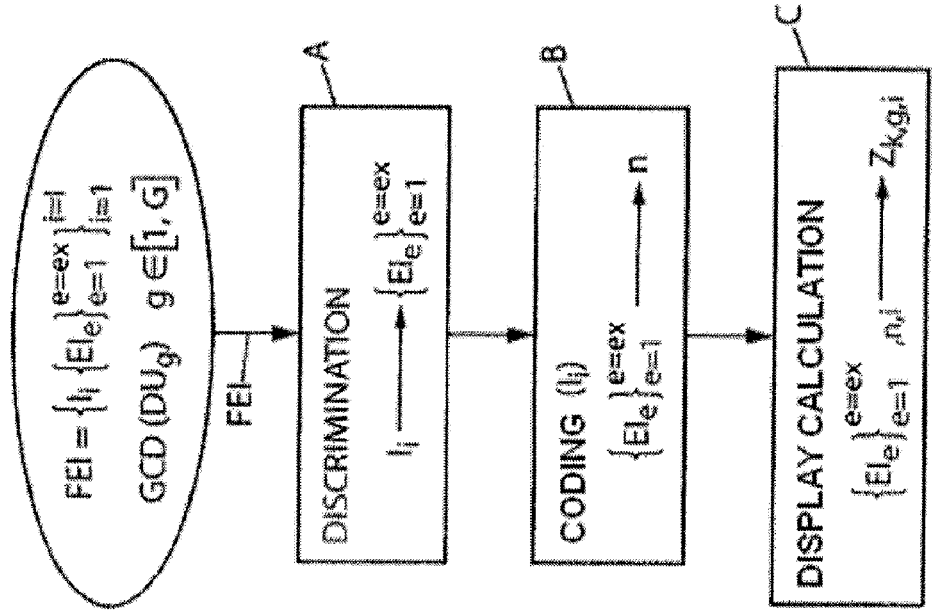
FIG. 2a shows, for illustration purposes, a flowchart of the essential steps of the coding method in the form of a file or set of digital data of a three-dimensional synthesis image of a digital mock-up of an object, in accordance with the subject-matter of the present invention.

With reference to FIG. 2a, the picture element stream is noted:

$$FEI = \{I_i \{EI_e\}_{e=1}^{e=ex}\}_{i=1}^{i=1}.$$

The method which is the subject-matter of the invention can in fact be applied to any picture element stream comprising any number of images $I_i$, each successive image comprising picture elements $EI_e$, each formed by a suitable geometrical figure comprising characteristics of shape, colour, luminance, and/or orientation according to a determined 3D-representation three dimensional axes. Each picture element $EI_e$ can have any shape, but in the context of applying the method which is the subject-matter of the invention, the shape shown is triangular according to the current standards for image synthesis.

The method which is the subject-matter of the invention is of course applied taking account of a display device labelled $DU_g$, where g denotes one or more addresses of the display device DU, in particular physical addresses of the latter.

It is understood in particular that for implementing the method which is the subject-matter of the invention, the latter can be executed either from a single display device or alternatively from a plurality of display devices and corresponding GCD display device drivers ($DU_g$). With regard to the flow of FEI picture elements, it is recalled that the latter corresponds to digital data, i.e. successions of bits from which it is of course possible to distinguish successive images $I_i$, and, in these successive images, previously-mentioned picture elements $EI_e$.

With reference to FIG. 2a, the method which is the subject-matter of the invention consists of a step A, for discriminating between elementary images in the picture element stream FEI, each constituting at least one part of the three-dimensional synthesis image for display.

According to a noteworthy feature of the method which is the subject-matter of the invention, it is shown that each elementary image consists of a subset of picture elements $EI_e$.

As shown in step A of FIG. 2a, the discrimination operation then consists of highlighting, in each successive image $I_i$, a plurality of elementary images each labelled $$\{EI_e\}_{e=1}^{e=ex}.$$

It should be noted, in particular, that any elementary image (subset of picture elements) includes at least one other subset of picture elements and in particular at least one picture element, while each image $I_i$ includes all the elementary images (subsets of corresponding picture elements).

Thus the number of picture elements forming each elementary image is not fixed, and the definition of each elementary image can be changed according to the content of these latter, as described later in the description. Thus it is understood that ex, last picture element of an elementary image, can have any value.

The above-mentioned discrimination operation is carried out on the input picture element stream by image $I_i$. This operation can be carried out on temporal, spatial or even illumination criteria, making it possible to distinguish, in the above-mentioned picture element stream, useful display areas relative to an a priori-determined content.

Step A is then followed by a step B consisting of coding each successive elementary image according to an index value representing the content of the considered picture element.

At step B in FIG. 2a, this operation is represented by the relationship:

$$\{EI_e\}_{e=1}^{e=ex} \rightarrow n.$$

In the above relationship, n denotes the index value representing the content of the elementary image $$\{EI_e\}_{e=1}^{e=ex}.$$

According to a noteworthy aspect of the method which is the subject-matter of the invention, the coding criterion according to the content of each elementary image can be a criterion of shape-recognition applied to the above-mentioned useful display areas, and/or of temporal succession of bit strings in the picture element stream FEI, and/or of three-dimensional positioning in the image $I_i$ of each considered picture element. It is understood that while each picture element $EI_e$ necessarily comprises a 3D orientation and positioning parameter in the considered image $I_i$, each elementary image (subset of picture elements) can then also be positioned and orientated by continuity.

Step B is then followed by a step C consisting of calculating the numerical values of the three-dimensional synthesis image for display from the index value n representing the content of each elementary image, and storing the corresponding numerical values of the synthesis image in the form of a digital file.

At step C in FIG. 2a, the display calculation operation is shown for an elementary image $\{EI_e\}_{e=1}^{e=ex}$ coded according to an index n and belonging to an image $I_i$:

$$\{EI_e\}_{e=1}^{e=ex}, n, i \rightarrow Z_{k,g,i}.$$

It is understood that, taking account of the coded content of the index n allocated to each considered elementary image, a display area in the image, area $Z_{k,i}$, is thus associated, taking account of the above-mentioned content and of course the development of the latter from one image to the subsequent image.

In fact, each display area in the image $Z_{k,i}$ is thus allocated to each corresponding elementary image, in particular on a criterion of similarity of the considered elementary image belonging to the current image of index i to the corresponding elementary image belonging to the subsequent image, indexed i+1.

The similarity criterion for the considered elementary images is represented by the relationship:

$$\{EI_e\}_{e=1}^{e=ex}, i \leftrightarrow \{EI_e\}_{e=1}^{e=ex}, i+1.$$

The above-mentioned similarity criterion is either an adaptive criterion established from the identity of the bit strings representing each picture element constituting the considered elementary image, or a criterion of visual distance of one or more bit strings representing the elementary image belonging to the current image from the elementary image belonging to the subsequent image.

According to another particularly noteworthy aspect of the method which is the subject-matter of the invention, the latter consists, in the above-mentioned step C, of associating the index value of a group of elementary images with an address value for the resources for calculating the numerical values of the three-dimensional synthesis image.

At step C of FIG. 2a, this operation is shown by the allocation of index g to the display area $Z_{k,i}$, which then becomes $Z_{k,g,i}$, where g denotes the address of a resource for the calculation of the numerical values of the three-dimensional synthesis image and in particular of the display device $DU_g$ or the graphics card driver $GCD(DU_g)$.

This method of operation appears particularly advantageous to the extent that it makes it possible to allocate, to each of the resources for calculating the numerical values, a group of specific elementary images according to their content, and thus to ensure spatial segmentation by content of the reconstituted three-dimensional synthesis image.

An embodiment of the coding method which is the subject-matter of the invention will now be given in connection with FIG. 2b.

The above-mentioned figure shows the discrimination step in the picture element stream of elementary images each constituting at least one part of the image displayed, by use of an input filter $F_1$ which is known, purely as a non-restrictive example, to carry out the discrimination of a elementary image formed by picture elements $EI_{ex-1}$, $EI_{ex}$ and $EI_{ex-2}$. This discrimination is shown symbolically by inclusion of the above-mentioned three picture elements in a closed area represented by hatching.

The coding is performed by the same input filter $F_1$ for the above-mentioned elementary image according to the index value n representing the content of the elementary image $$\{EI_e\}_{e=ex-2}^{e=ex}.$$

According to a particularly advantageous embodiment of the method which is the subject-matter of the invention, the index value can be obtained by the application of a hashing function to the above-mentioned elementary image. This operation is shown at the level of the input filter $F_1$, by the operation:

$$n = H\{EI_e\}_{e=ex-2}^{e=ex}.$$

In this relationship, H denotes the hashing function applied overall to the picture elements constituting the considered elementary image.

Finally, the operation for the calculation of the numerical values for the three-dimensional synthesis image starting from the value of an index n representing the content of each elementary image is implemented, for example, by an output filter referenced $F_2$, which allows a correspondence to be established to the above-mentioned elementary image $\{EI_e\}_{e=ex-2}^{e=ex}$, n, i, i.e. to the elementary image with which is associated the index value n for the considered index image i, a display area $Z_{k,g,i}$ by allocation, to each of the resources for the calculation of the numerical values, of a group of specific elementary images according to their content and thus providing a spatial segmentation by content of the three-dimensional synthesis image.

It is of course understood that one or more graphics cards can correspond to address g of the resources for the calculation of the synthesis image, i.e. the address of the graphics card driver $GCD(D_g)$, as will be described later in the description.

The method which is the subject-matter of the invention, as described in connection with FIG. 2b, is moreover noteworthy in that it can consist of calculating a priority coefficient for use in the display, labelled PC, for each elementary image $EI_e$, starting from the above-mentioned index value n. In fact, any application module is capable of complying with various standards as regards the choice in the definition of the sets and subset of picture elements forming each elementary image, and, finally the presentation of the successive elementary images to the display graphics card.

The above-mentioned priority coefficient PC is a function of the calculated index value n and the number of pixels Npx of each considered picture element, according to the relationship:

$$PC = f(n, Npx).$$

Implementation of the above-mentioned priority coefficient PC makes it possible to optimize and reduce the access time of the elementary image to the graphics card display resources for executing the above-mentioned display.

This makes it possible to further reduce the overall display time of the set.

Finally, in a non-restrictive preferred embodiment of the method which is the subject-matter of the invention, the latter can moreover advantageously consist of calculating a prediction value for the future execution by the application module of each elementary image from the display viewpoint. This prediction value Pr is a function of the priority coefficient PC, Pr(PC), and can be calculated as a number of display execution cycles for each considered picture element.

The method which is the subject-matter of the invention can then consist, according to a noteworthy aspect of the latter, of adapting the execution data of the application module, by execution of a function making it possible to adapt the parameters for RAM space used by the application module, such as address and extent of the memory area, labelled $RAM_{mem}(A, S_z)$, where A denotes the address and $S_z$ the extent of the above-mentioned RAM area, and the execution registers of the application module at the level of the execution processor of the application module, labelled Req(Exec) where Exec denotes the context of execution of the application module instruction by the corresponding register.

The corresponding adaptation function calculated starting from the priority coefficient PC is labelled:

$$AA(RAM_{mem}(A, S_z), Req(Exec)),$$

where A denotes the address of the elementary image in RAM, $S_z$ denotes the extent of RAM used for display of the considered elementary image in the display area of address z, Exec denotes the context of execution of the application module instruction.

The transition between the prediction value Pr(PC) and the above-mentioned parameters of the adaptation function can be executed by means of a dynamically-managed look up table.

Figure 3B:
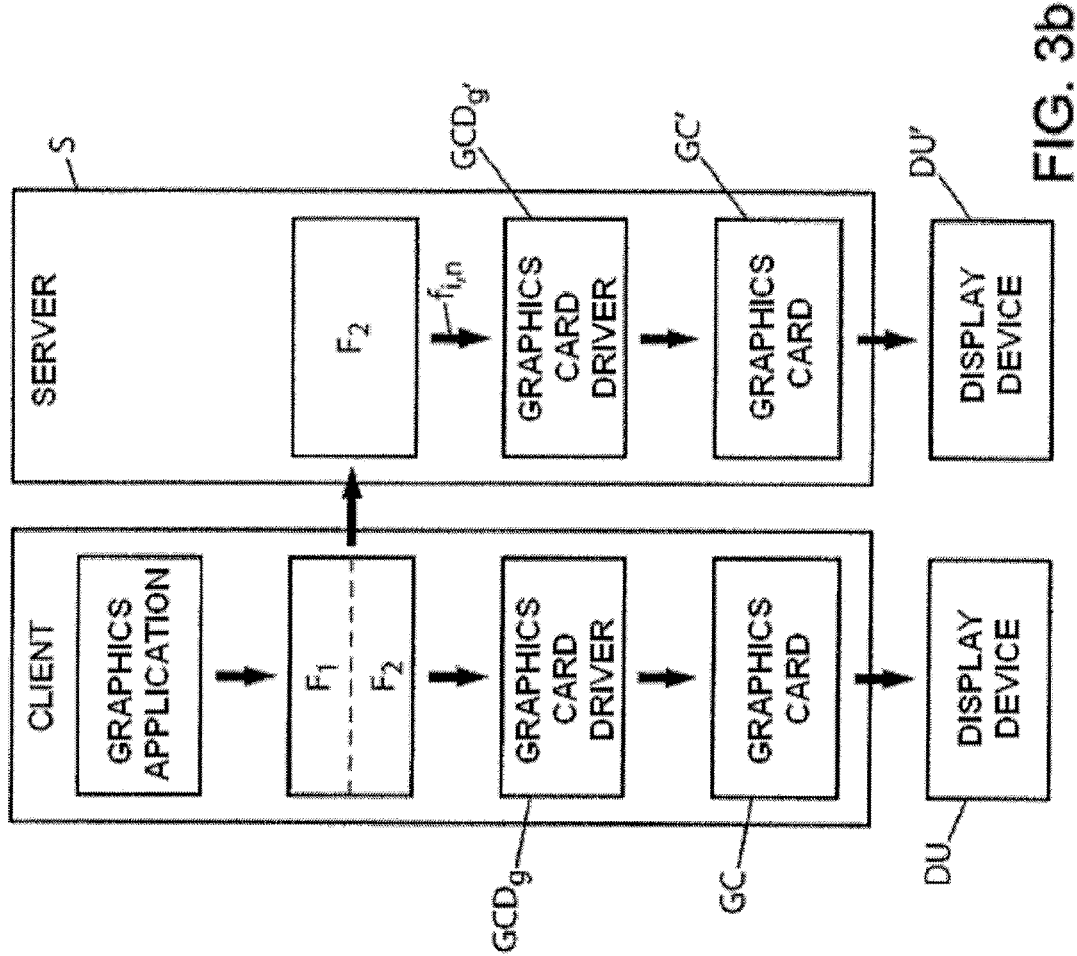
FIG. 3b shows, for illustration purposes, a first preferred embodiment of the system which is the subject-matter of the invention, in the form of a client/server architecture.
Figure 3A:
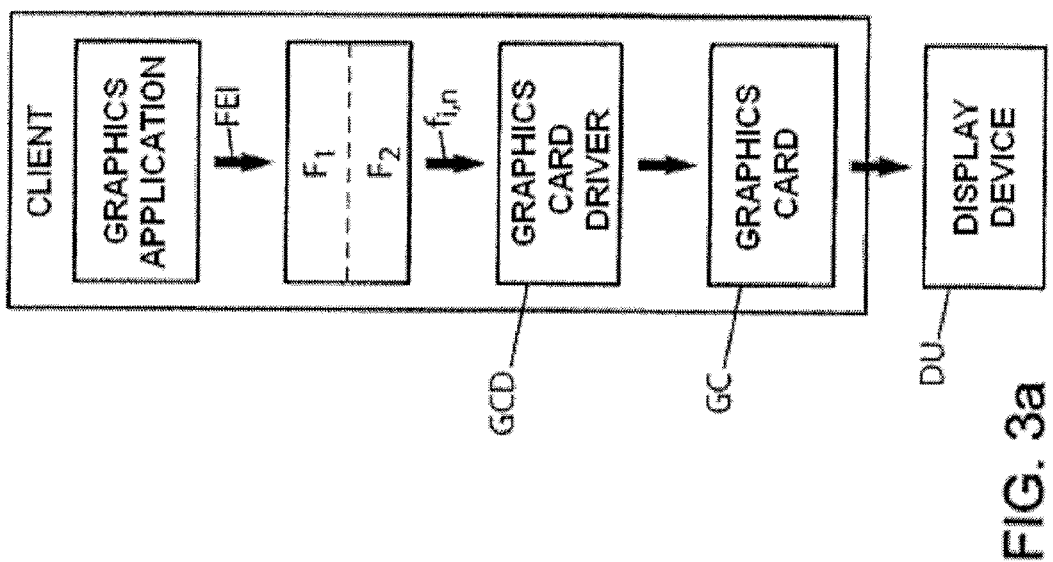
FIG. 3a shows, for illustration purposes, a system for display on a screen of a digital mock-up in the form of a synthesis image, according to the subject of the present invention.

A more detailed description of a system for displaying a digital mock-up of an object on a screen in the form of a three-dimensional synthesis image starting from an application module comprising a user interface according to the subject-matter of the present invention will now given in connection with FIG. 3a and the figures following.

The description of the device which is the subject-matter of the invention in connection with FIG. 3a is given in the framework of a client device running a graphics application delivering a stream, the picture element stream FEI previously described in the description.

Of course in addition to the graphics card driver GCD and the graphics card proper GC constituting a terminal in the form of a client architecture for example, in standard fashion it also comprises a display device DU.

According to a noteworthy aspect of the system which is the subject-matter of the invention, the latter comprises a module for filtering the picture element stream FEI installed at the input to the resources for the calculation of the three-dimensional image, in particular installed between the graphics application delivering the picture element stream FEI and the graphics card driver GCD.

As described previously in connection with the implementation of the method which is the subject-matter of the invention, it is shown that the filter module advantageously comprises a discrimination module, the filter $F_1$ in the stream of picture elements FEI of elementary images, each constituting at least one part of the image for display. Each picture element constitutes a subset of picture elements as described previously in the description.

It also comprises a module for coding each successive elementary image, the filter $F_2$, as described previously in the description, which executes a coding according to an index value n representing the content of the considered elementary image.

The index values n are delivered to the module for the calculation of the three-dimensional image and in particular to the graphics card driver GCD.

It is understood in particular that for a current image $I_i$ and a subsequent image $I_{i+1}$, the display system procedure which is the subject-matter of the invention makes it possible, due to the transmission of the index value n, to retrieve successive elementary images and in particular the picture elements constituting the latter. It will readily be understood that the picture elements and the corresponding elementary images are stored in a digital file in accordance with the coding method which is the subject-matter of the invention and that the index value n of course makes it possible, by simple addressing to an address linked to the value of n, to retrieve the picture element or the elementary image constituting same.

This procedure makes it possible to significantly increase the fluidity of the display by the display screen, the flow of data between the filter module, in particular the filter $F_2$, and the graphics card driver GCD being for this raison labelled $F_{1,n}$.

It is understood that the fluidity of the display by the display screen, in particular by the display device DU using the graphics card GC, makes it possible to increase the fluidity of the display by the latter by reconstitution of the content of each elementary image by the means for calculating three-dimensional images. This reconstitution is in particular carried out starting from the index value n.

In particular, the above-mentioned index value is a numerical value obtained by application of a hashing function to at least each successive elementary image, as previously described in the description.

The index value n can be constituted by a numerical value representing the space-time discrepancy between two successive equivalent elementary images contained in two successive views of the object.

In particular, it is understood that, while the calculation can be carried out on each current image and subsequent successive image, as previously mentioned in the description, the representative value of the space-time discrepancy is then taken into account only when a significant change in this discrepancy value takes place, in particular for two successive equivalent elementary images comprised in two successive views of the object.

It is thus possible to minimize the volume of information required for coding the three-dimensional images according to the difference representing this space-time discrepancy, which is shown in terms of index value.

A more detailed description of a display system according to the subject-matter of the present invention in the framework of a client/server architecture is now given in connection with FIG. 3b.

The above-mentioned client/server architecture can be implemented in either a single-station or multi-station context.

Overall, the system which is the subject-matter of the invention can be arranged so as to comprise a client architecture corresponding substantially to the one shown in FIG. 3a, in which the coding module, i.e. the filter $F_2$, can consist of a filter directly dedicated to the graphics card driver $GCD_g$.

In these conditions, the coding module formed by said filter $F_2$ can be directly dedicated to the graphics card driver of the corresponding client terminal.

Moreover, in a single-station or multi-station version, a server element S can be directly linked to the previously-mentioned client element, a coding module $F_2$ being directly linked to the discrimination module formed by the filter $F_1$. In these conditions, the coding module $F_2$ then makes it possible to deliver the processed picture element stream $f_{1,n}$ to a system consisting of a graphics card driver $GCD_g$, a graphics card proper GC' and of course a display device DU'.

By means of the server element feature of the thus-constituted set S, it is possible to provide a multi-station application for the set.

A preferred embodiment of the system of displaying on a screen a digital mock-up of an object in the form of a three-dimensional synthesis image, in the form of client/server architecture, will now be described in connection with FIG. 3c.

In this situation, the client architecture consists essentially of the graphics application itself and at least the discrimination module formed by the filter $F_1$ previously described in the description.

The set is linked by means of a computer network IN to a plurality of servers $S_1$, $S_2$ to $S_3$, non-restrictively $S_N$, not shown on the drawing.

Each server $S_1$, $S_2$, $S_3$ to $S_N$ advantageously comprises the server structure S shown in FIG. 3b, namely a coding module formed by a filter $F_{21}$, a graphics card driver $GCD_1$ and a graphics card proper $GC_1$ for the server $S_1$, this structure being repeated by changing the indices 1 to indices 2 and 3 for servers $S_2$, $S_3$ to $S_N$.

Each server $S_1$, $S_2$, $S_3$ to $S_N$ is itself linked to an image network IA allowing the transmission of image data and in particular streams of processed picture elements $F_{1,n}$ relating to each of the above-mentioned servers $S_1$ to $S_N$.

Figure 3C:
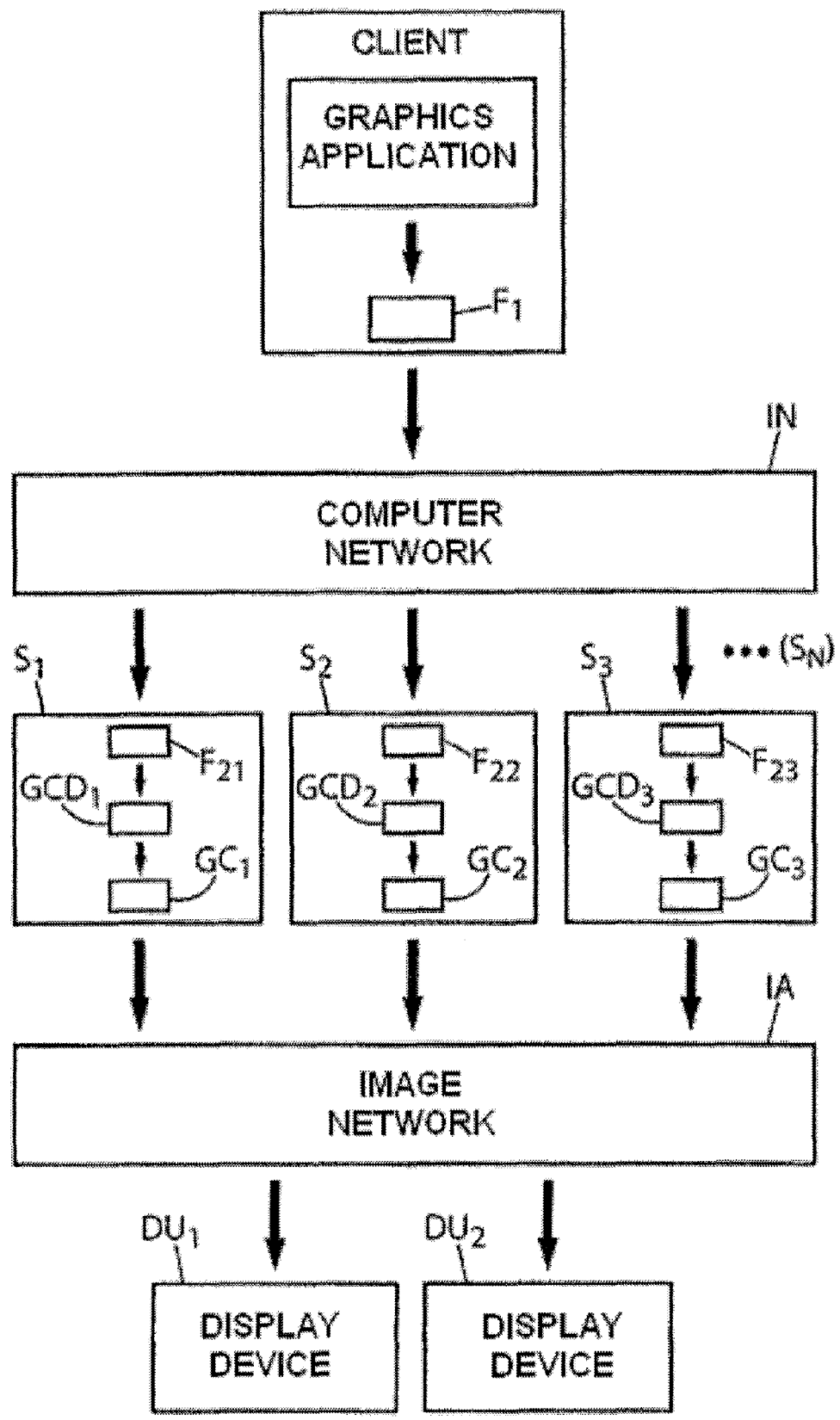
FIG. 3c shows, for illustration purposes, a second preferred embodiment of the system which is the subject-matter of the invention shown in FIG. 3a, in which embodiment the resources for the calculation of the 3D synthesis image are constituted by a plurality of 3D graphics cards connected in parallel.

One or more display devices, labelled non-restrictively $DU_1$ to $DU_2$ in FIG. 3c, are also connected to the image network IA.

With reference to FIG. 3c, it is understood that the module for the calculation of the three-dimensional image is constituted by a plurality of 3D graphics cards, $GC_1$, $GC_2$, $GC_3$ to $GC_N$, which are then connected in parallel between the filter module $F_1$ and the screen constituted by the display device $DU_1$ or $DU_2$.

According to a noteworthy aspect of the system which is the subject-matter of the invention, each above-mentioned graphics card comprises a particular access address g=1, 2, 3 or N, each index value n representing the content of each successive elementary image of a group of elementary images constituting the whole or part of the object image for display being associated with a specific access address value of one of the graphics cards.

The above procedure is represented by the use of the output filter $F_2$ in FIG. 2b and by the relationship:

$$\{EI_e\}_{e=ex-2}^{e=ex}, n,i \rightarrow Z_{k,g,i}$$

where g denotes the above-mentioned specific access address, $Z_k$ denotes a display area corresponding to a group of elementary images constituting all or part of the object image displayed, and n of course denotes the index value representing the content of each successive elementary image of this corresponding image group.

This procedure makes it possible to allocate a specific group of elementary images, according to their content, to each of the graphics cards, and thus to ensure a spatial segmentation by content of the display by masking and thus achieve an acceleration of the fluidity of the display.

It is understood, in particular, that the notion of masking covers the display of the considered group of images for the particular access address g, which of course involves the masking of all the different image groups for the same specific access address g.

The masking operation can thus be shown by the symbolic relationship:

$$n \leftrightarrow \{g,k\}.$$

Figure 4:
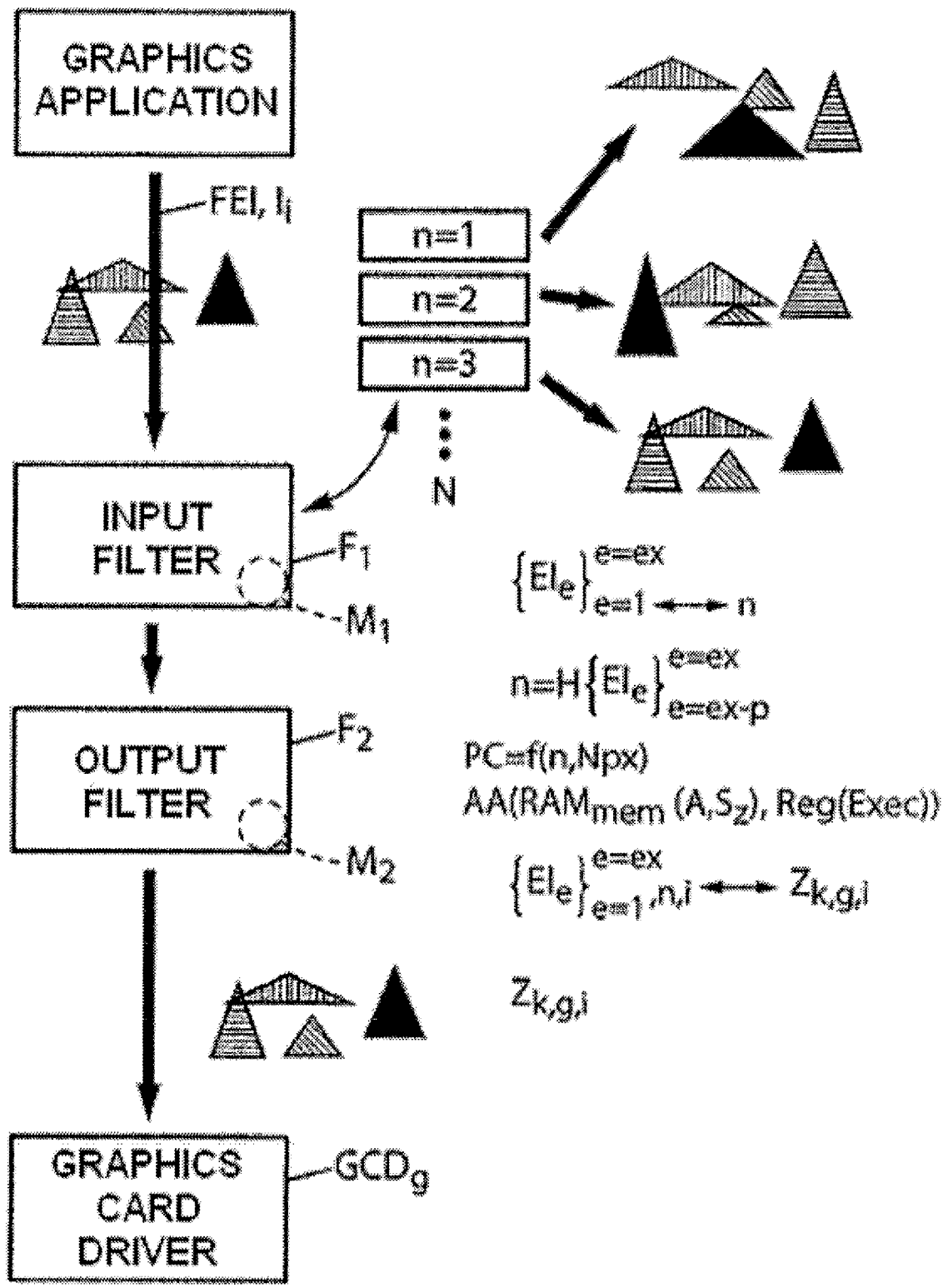
FIG. 4 represents, for illustration purposes, the operating procedure of a system which is the subject-matter of the invention as shown in FIG. 3a, 3b or 3c.

A corresponding procedure is shown in FIG. 4 for one of the servers $S_1$ to $S_3$ shown in the drawing of FIG. 3c.

In the above-mentioned FIG. 4, it is understood that the existence of the computer network IN and the image network IA do not in any way alter the input filter $F_1$ or the output filter $F_2$ as shown in the drawing of FIG. 4.

As regards the procedure for the calculation of the index n, the numerical value representing the space-time discrepancy of two successive equivalent picture elements comprised in two successive views of the object, it is indicated that the above-mentioned module comprises a module $M_1$ for correlating a plurality of successive picture elements to the same storage address and of course the same index value.

It is understood in particular that successive elementary images, having a single content, have a high inter-correlation value, justifying on the one hand, their storage at a single address, and on the other hand, the calculation of a single index value by means of the application of the hashing function to this elementary image or images.

The above-mentioned procedure of course makes it possible to take the index value n allocated to the latter, i.e. to the elementary image or to a group of elementary images, as a value representing the content of the above-mentioned images and their storage address.

In particular, the module $M_1$ allows the implementation of all the functions described within the framework of the implementation of the method illustrated and described in connection with FIG. 2b, in particular, calculation of the priority coefficient PC, the predictive value Pr(PC) and the adaptation function $AA(RAM_{mem}(A,S_z), Req(Exec))$.

Finally, the output filter $F_2$ advantageously comprises a module $M_2$ for inhibiting the correlation module for any elementary image or group of elementary images recognized as correlated to the same address.

For the reason previously stated, it is understood that the correlation of elementary images or groups of elementary images to the same storage address makes it possible to draw a conclusion as to their similar content and the transmission of the corresponding index value n to the module for the calculation of the three-dimensional image, which of course makes it possible to accelerate the display.

Figure 5:
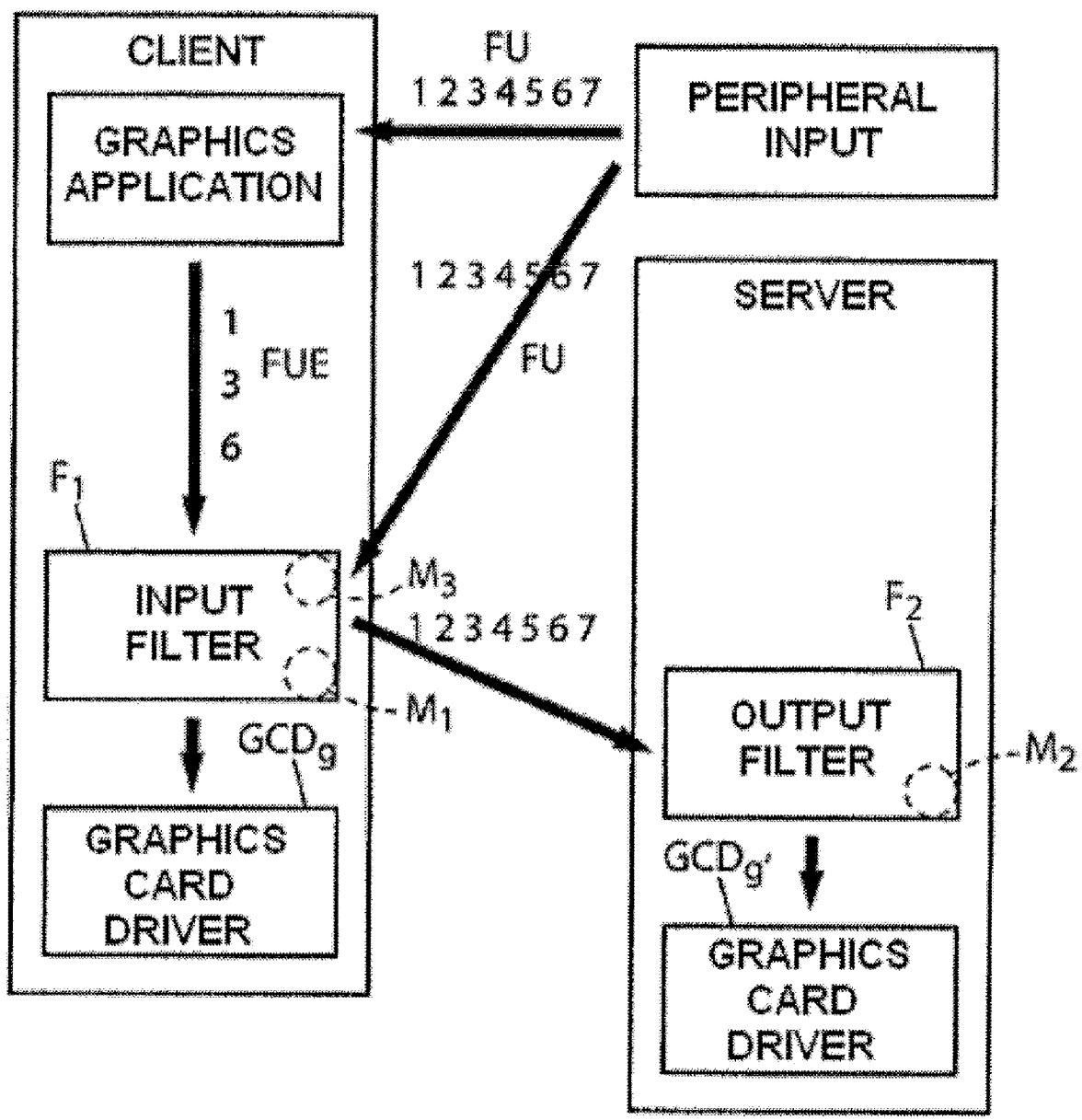
FIG. 5 represents, for illustration purposes, a system which is the subject-matter of the invention, provided with a user interface and a module for learning the development principle, when an alteration to a viewpoint of the object image is introduced from a peripheral acting as this user interface.

A more detailed description of a preferred embodiment of the system which is the subject-matter of the invention, when this system is particularly dedicated to a system allowing a user to introduce alterations to the three-dimensional representation of a synthesis image, is now given in connection with FIG. 5.

The alteration introduced by a user to the viewpoint of the object image is performed by the latter from an input peripheral acting as user interface. This user interface can consist of a joystick, or an articulated robot in the case of a remotely controlled surgical operation, or finally any user-assisted operation on a graphics application for 3D presentation by synthesis image.

To this end, the system which is the subject-matter of the invention further comprises a module $M_3$ for learning the development principle during the introduction of an alteration to a viewpoint of the object image from the above-mentioned user interface formed by the peripheral, with the purpose of anticipating the results of the calculation and reducing the computing time of the application module or graphics application.

As shown in FIG. 5, the user stream introduced from the peripheral interface is marked:

$$FU=1, 2, 3, 4, 5, 6, 7,$$

where the string of characters 1 to 7 represents, illustratively, the user stream transmitted by the latter.

The processing procedure for carrying out the learning of the development principle then consists of sampling the user stream FU from the user interface at a sampling frequency less than that of the transmitted user stream. By this sampling process the application module or graphics application makes it possible to generate a sampled user stream FUE which for convenience is represented by the truncated sequence 1, 3, 6. This sampled stream FUE is then transmitted to the input filter $F_1$.

The input filter also receives the user stream FU transmitted directly by the user interface. The input filter $F_1$ then proceeds to a comparison between the user stream FU and the sampled user stream FUE. The comparison between the above-mentioned streams is carried out by identification of picture elements by the module $M_3$. This comparison is expressed as:

A picture element $EI_{e'}$ belonging to the stream FU transmitted by the user corresponds to a picture element $EI_e$ belonging to the sampled stream FUE.

Construction of the learning principle is then based on a criterion of difference between image or picture element and correlated with the user stream FU. The module for comparison and construction of the learning principle contained in the filter $F_1$ then makes it possible to reconstruct an image IFU, i.e.:

$$IFU=1, 2, 3, 4, 5, 6, 7$$

of the user stream, which of course makes it possible, at the level of the output filter $F_2$ receiving the image IFU from the user stream, to anticipate the response which would have been made by the graphics application to the user stream FU.

The invention also relates to a computer program comprising a suite of instructions stored on a memory medium for implementation by a computer or by an onscreen display system of a digital mock-up, by means of an application module comprising a user interface, this application module delivering from this digital mock-up a model of this object formed by a picture element stream to a module for the calculation of a three-dimensional image which can be displayed on a screen, noteworthy in that, when it is executed, said instructions perform the steps of discrimination, coding and calculation of the numerical values of the three-dimensional synthesis image, starting from the index value representing the content of each elementary image and the storage of these numerical values of this synthesis image in the form of a digital file of the method as described in connection with FIGS. 2a and 2b.

When this program is modular, it comprises at least one software module $M_1$ for discrimination, in a stream of picture elements, of those elementary images each constituting a part of the image for display and coding of each elementary image according to an index value representing the content of each elementary image. The software module $M_1$ is installed in the input filter $F_1$ of a client element of a client/server architecture as described and shown in FIGS. 4 and 5.

Similarly, it comprises a software module $M_2$ for calculating numerical values for the three-dimensional synthesis image starting from the index value representing the content of each elementary image. As shown in FIGS. 4 and 5, the software module $M_2$ is installed in the output filter $F_2$ of a server element of a client/server architecture.

Finally, this computer program comprises a software module $M_3$ for learning the development principle, when an alteration takes place to a viewpoint of the image from a user interface, this software module $M_3$ being installed in a client element of a client/server architecture and making it possible to anticipate the calculation results and reduce the time for calculation of the graphics application, as shown in FIG. 5.

The method and the display system of synthesis images which are the subject-matter of the invention have been implemented and have been the subject of comparative tests, the results of which are given below.

The above-mentioned tests consisted of the implementation of the application module CATIA®, which allows the definition of elementary images each comprising 10 million picture elements consisting of triangles, and the execution of this application module from a workstation equipped with a 3 GHz INTEL® Pentium IV processor and NVIDIA® Fx 3000 graphics card, as a reference test in the absence of any coding in accordance with the invention. The comparative tests of display speed expressed in number of images per second are given in relation to the reference test for a coding by:

indexation n, indexation n+priority coefficient PC according to the following table.

| Test | Display speed |
|---|---|
| Reference test | 2 images/second |
| Indexation: n | 3 images/second: gain 50% |
| Indexation: n + PC | 4 images/second: gain 100% |

Moreover, a separate test on a test bench for an indexation n+calculation of the priority coefficient PC and adaptation function $AA(RAM_{mem}(A, S_z), Req(Exec))$ showed a gain in display speed, in number of images per second, of 400%.

Similarly, the implementation of a module for learning the development principle for a viewpoint of the image made it possible to demonstrate a gain in display speed of 200%. It is understood that the above-mentioned speed gains are cumulative.

The invention claimed is:

1. A system for displaying on a screen a digital geometry data of an object in the form of a synthesis image, by means of an application module comprising a user interface, said application module delivering, from said digital geometry data, a model of said object formed by a stream of picture elements to a means for the calculation of a three-dimensional image which can be displayed on said screen, wherein said system comprises at least means for filtering said picture element stream, installed at the input of said means for the calculation of a three-dimensional image and comprising:

means of discrimination, in said picture element stream, of elementary images each constituting at least one part of the image for display;

means for coding each successive picture element according to an index value representing the content of said picture element;

wherein said index value is a numerical value obtained by application of a hashing function to each successive elementary image;

wherein said index values are delivered to said means for the calculation of a three-dimensional image, making it possible to increase the fluidity of the display by the display screen, by reconstituting the content of each elementary image by said means for the calculation of a three-dimensional image.

2. The system according to claim 1, wherein said index value is a numerical value representative of the space-time discrepancy between two successive equivalent elementary images contained in two successive views of this object.

3. The system according to claim 1, wherein said means for the calculation of a three-dimensional image consist of a plurality of 3D graphics cards connected in parallel between said filter means and said screen, each graphics card comprising a specific access address, each index value representing the content of each successive elementary image of a group of elementary images constituting all or part of the object image for display being associated with a specific access address value of one of the graphics cards, making it possible to allocate to each of the graphics cards a group of elementary images which are specific in relation to their content, and thus provide a spatial segmentation by content of the display by masking and an acceleration of the fluidity of the display.

4. The system according to claim 1, wherein said means for coding each elementary image according to an index value representing the content of said picture element comprise means for the correlation of a plurality of successive elementary images at the same storage address and same index value, said index value representing said elementary image respectively of said group of elementary images being transmitted to said means for the calculation of a three-dimensional image.

5. The system according to claim 4, wherein said filter means further comprise means for the inhibition of said correlation means for any elementary image or group of elementary images recognized as correlated to the same address, making it possible to transmit an index value linked to said address to said means for the calculation of a three-dimensional image and to accelerate the display.

6. The system according to claim 1, said system further comprising means for learning the principle of development when an alteration is introduced to a viewpoint of the object image from a peripheral acting as user interface, making it possible to anticipate the calculation results and to reduce the computing time of said application module, said computing time being made substantially independent of the actual capacity of said application module to calculate successive images of said object.

7. A coding method in the form of a digital file of a three-dimensional synthesis image of a digital geometry data of an object, starting from a model of said object formed by a stream of picture elements delivered by an application module starting from said digital geometry data, said method consisting at least in:

distinguishing, in said picture element streams, elementary images each constituting at least one part of the three-dimensional synthesis image for display;

coding each successive elementary image according to an index value representing the content of said picture element, wherein said index value is a numerical value obtained by application of a hashing function to each successive elementary image;

calculating the numerical values of said three-dimensional synthesis image starting from said index value representing the content of each elementary image, and storing said numerical values of said synthesis image in the form of a digital file.

8. The method according to claim 7, said method further consisting in associating said index value of a group of elementary images with an address value of the resources for the calculation of the numerical values of said three-dimensional synthesis image, making it possible to allocate to each of the calculation resources of said numerical values a group of specific elementary images according to their content and thus provide a spatial segmentation of the three-dimensional synthesis image.

9. The method according to claim 7, said method including calculating a priority coefficient for use in the display for each elementary image, starting from the index value.

10. The method according to claim 9, said method further consisting in:

calculating a prediction value for the future execution of the display of each elementary image by the application module;

adapting the execution data of the application module relating to the RAM and the execution registers implemented by said application module.

11. A computer program comprising a suite of instructions stored on a non-transitory memory medium for implementation by a computer or by an onscreen display system of a digital geometry data, by means of an application module comprising a user interface, this application module delivering from this digital geometry data a model of this object formed by a stream of picture elements to a module for the calculation of a three-dimensional image which can be displayed on a screen, wherein, said method being executed, said instructions perform the steps of discrimination, coding and calculation of the numerical values of the three-dimensional synthesis image, starting from the index value representing the content of each elementary image and the storage of these numerical values of this synthesis image in the form of a digital file of the method according to claim 8, wherein said index value is a numerical value obtained by application of a hashing function to each successive elementary image.

12. The program according to claim 11, said program being installed in modular form, said program comprising at least one software discrimination module, in a stream of picture elements, of elementary images each constituting a part of the image for display and coding of each elementary image according to an index value representing the content of each picture element, said software module being installed in a client element of a client/server architecture.

13. The program according to claim 12, said program further comprising a software module for the calculation of numerical values of the three-dimensional synthesis image starting from the index value representing the content of each elementary image, said software module being installed in a server element of a client/server architecture.

14. The program according to claim 12, said program further comprising a software module for learning the development principle, when an alteration takes place to a viewpoint of the image from a user interface, this software module being installed in a client element of a client/server architecture, making it possible to anticipate the calculation results and reduce the time for calculation of the graphics application.

* * * * *